United States Patent
Wheeler

[19]

[11] Patent Number: 6,016,717
[45] Date of Patent: Jan. 25, 2000

[54] HELICAL CABLE ACTUATOR FOR SHIFT BY WIRE SYSTEM

[75] Inventor: Douglas J. Wheeler, Farmington Hills, Mich.

[73] Assignee: Teleflex Incorporated, Plymouth Meeting, Pa.

[21] Appl. No.: 09/080,429

[22] Filed: May 18, 1998

[51] Int. Cl.[7] .............................. B60K 20/00; F16H 59/00
[52] U.S. Cl. ................................... 74/473.12; 74/473.15; 74/502.5; 74/335
[58] Field of Search .............................. 74/473.12, 473.1, 74/473.14, 473.15, 512, 513, 560, 501.5 R, 501.6, 335, 502.5; 29/401.1

[56] References Cited

U.S. PATENT DOCUMENTS

| | | |
|---|---|---|
| Re. 34,064 | 9/1992 | Tury et al. . |
| 4,402,160 | 9/1983 | Brusasco ................................ 74/502.5 |
| 4,790,204 | 12/1988 | Tury et al. . |
| 4,841,793 | 6/1989 | Leigh-Monstevens et al. .......... 74/335 |
| 4,846,772 | 7/1989 | Saruta et al. ............................ 474/271 |
| 5,068,583 | 11/1991 | Gresham et al. . |
| 5,085,106 | 2/1992 | Bubnash ................................. 74/866 |
| 5,351,570 | 10/1994 | Mizunuma et al. ...................... 74/335 |
| 5,577,416 | 11/1996 | Fukura et al. .......................... 74/502.5 |
| 5,865,705 | 2/1999 | Shamoto et al. ......................... 74/335 |
| 5,881,853 | 3/1999 | Peuster et al. ............................ 74/335 |

*Primary Examiner*—David M. Fenstermacher
*Attorney, Agent, or Firm*—Howard & Howard

[57] ABSTRACT

An electric shift apparatus (10) for shifting a vehicle transmission assembly (12) includes a mounting structure (20) adapted to be mounted to a transmission housing (22), an electric motor (24) supported by the mounting structure (20), and a drive assembly (26) operably driven by the electric motor (24). The apparatus (10) further includes a core element (28) movably supported by the mounting structure (20) and a guide (30) for guiding the core element (28). A terminal (32) is slidably disposed in the guide (30) and connected to the core element (28). A shift lever (34) is movable between a plurality of shift positions and connected to the terminal (32) for shifting a transmission. The apparatus (10) is characterized by the core element (28) comprising a helical cable (36) which is driven by the drive assembly (26) for linear actuation of the shift lever (34). The helical cable (36) is comprised of a filamentous member (38) and a core member (40) that defines a longitudinal axis (42). The filamentous member (38) is wound in spaced convolutions to define tooth-like members (44). The tooth-like members (44) are spaced apart from one another along the core element (38) and are in driven engagement with the drive assembly (26).

26 Claims, 4 Drawing Sheets

HELICAL CABLE ACTUATOR FOR SHIFT BY WIRE SYSTEM

TECHNICAL FIELD

This invention relates to an electric shift apparatus for shifting a vehicle transmission. More specifically, the invention relates to a motor driven drive assembly for driving a helical cable for linear actuation of a transmission shift lever.

BACKGROUND OF THE INVENTION

A typical automatic transmission receives input from a driver via a mode select lever that is movable between various shift positions, such as drive, reverse, park, or neutral. Typically this mode select lever is connected to a cable or linkage assembly that extends to a transmission shift lever. When the driver selects a specific shift position by actuating the mode select lever, the cable or linkage assembly actuates the transmission shift lever which causes the transmission to shift into the desired gear.

Various systems have been proposed to replace the mechanical cable and linkage assembly connections with electrical shifting systems. These electrical shifting systems produce electric signals, derived from driver input as to desired mode selection, which are transmitted to a power source that shifts the transmission shift lever. Two such systems are shown in U.S. Pat. No. 4,790,203 granted Dec. 3, 1988 to Tury et al. and U.S. Pat. No. 5,068,583 granted Nov. 26, 1991 to Gresham et al. Systems such as these are often expensive, take up a great amount of valuable packaging space, and require significant modification to the vehicle transmission. Thus, it is desirable to provide an electric shift apparatus that improves packaging, reduces systems cost, and which is easily installed onto existing transmissions with minimal modifications.

SUMMARY OF THE INVENTION AND ADVANTAGES

An electric shift apparatus for a shifting a vehicle transmission assembly comprising a mounting structure adapted to be mounted to a vehicle structure, an electric motor supported by the mounting structure, and a drive assembly operably driven by the electric motor. The apparatus further includes a core element movably supported by the mounting structure and a guide for guiding the core element. A terminal is slidably disposed in the guide and connected to the core element. A shift lever is movable between a plurality of shift positions and connected to the terminal for shifting a transmission. The apparatus is characterized by the core element comprising a helical cable which is driven by the drive assembly for linear actuation of the shift lever.

Accordingly the subject invention provides, an electronic shift apparatus that is easily attached to almost any transmission and that is less expensive than prior art systems. The system is also compact, which increases the packaging space available for other vehicle components. The subject invention also provides flexible mounting for the electric shift apparatus as it can be located close to the transmission shift lever or up to several inches away from the lever, depending on what packaging space is available.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
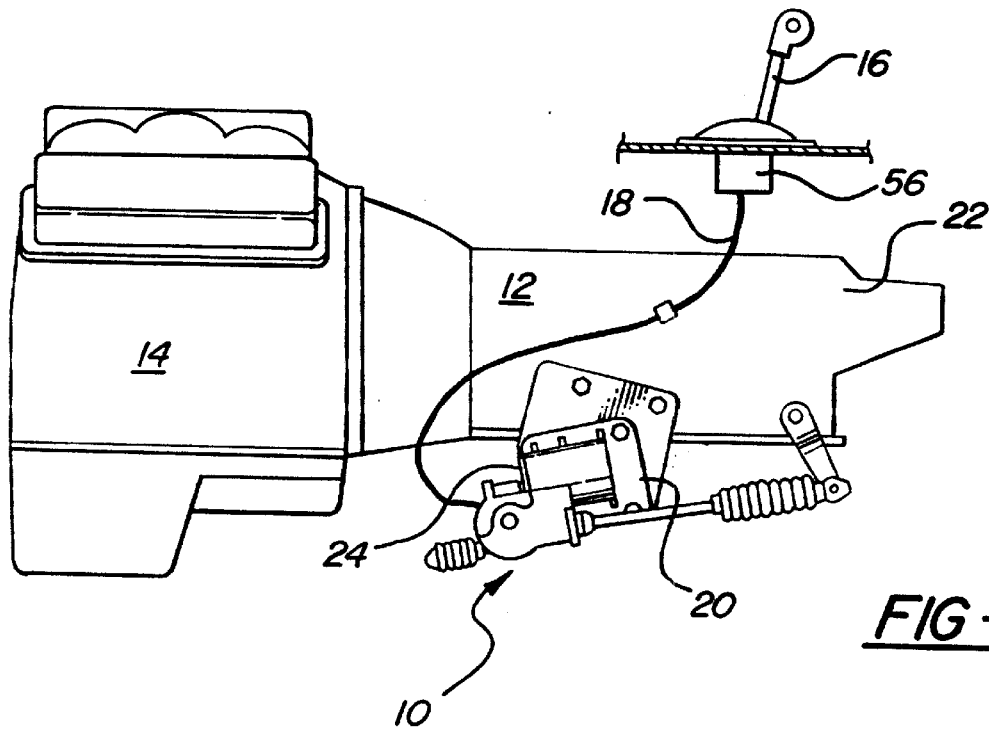
FIG. 1 is a side view of the subject invention connected to a vehicle transmission assembly.

Referring to the Figures, wherein like numerals indicate like or corresponding parts throughout the several views, an electric shift apparatus is shown generally at 10 in FIG. 1. The electric shift apparatus 10 controls the shifting of a vehicle transmission 12 among various transmission shift positions. The transmission 12 receives input torque and speed from an engine 14 and transmits output torque to a vehicle driveline (not shown). The shifting of the transmission among the various shift positions, increases, decreases, or eliminates the output torque to the driveline depending on which shift position has been selected.

The electric shift apparatus 10 is electrically connected to a mode select lever 16 by an electrical connector 18 well known in the art. The mode select lever 16 is operated by a driver (not shown) who moves the mode select lever 16 among a plurality of shift positions, such as park, reverse, neutral, drive, or low gear, for example. Once the driver selects a desired shift position, the electric shift apparatus 10 is activated and the transmission 12 is shifted into the desired shift position.

The electric shift apparatus 10 includes a mounting structure 20 adapted to be mounted to a vehicle structure such as a transmission housing 22, for example. The mounting structure 20 is preferably mounted to the transmission housing 22 but could also be mounted to any other vehicle structure depending on what packaging space is available. The electric shift apparatus 10 also includes an electric motor 24 that is supported by the mounting structure 22 and a drive assembly 26 that is operably driven by the electric motor 24, shown in FIG. 2.

A core element 28 is movably supported by the mounting structure 20 and is guided by a guide member 30. A terminal 32 is slidably disposed in the guide member 30 and connected to the core element 28. The terminal 32 is connected to a shift lever 34 which is pivotally supported on the transmission 12. The shift lever 34 shifts the gears (not shown) housed within the transmission 12 and is movable between a plurality of shift positions.

The core element 28 of the electric shift apparatus 10 is comprised of a helical cable 36 driven by the drive assembly 26 for linear actuation of the shift lever 34. The helical cable 36 is comprised of a filamentous member 38 and a core member 40, defining a longitudinal axis 42. The filamentous member 38 is wound about the core member 40 along the longitudinal axis. The filamentous member 38 is wound in spaced convolutions to define tooth-like members 44 that are spaced apart from one another along the core member 40. The tooth-like members 44 are in driven engagement with the drive assembly 26.

Figure 3:
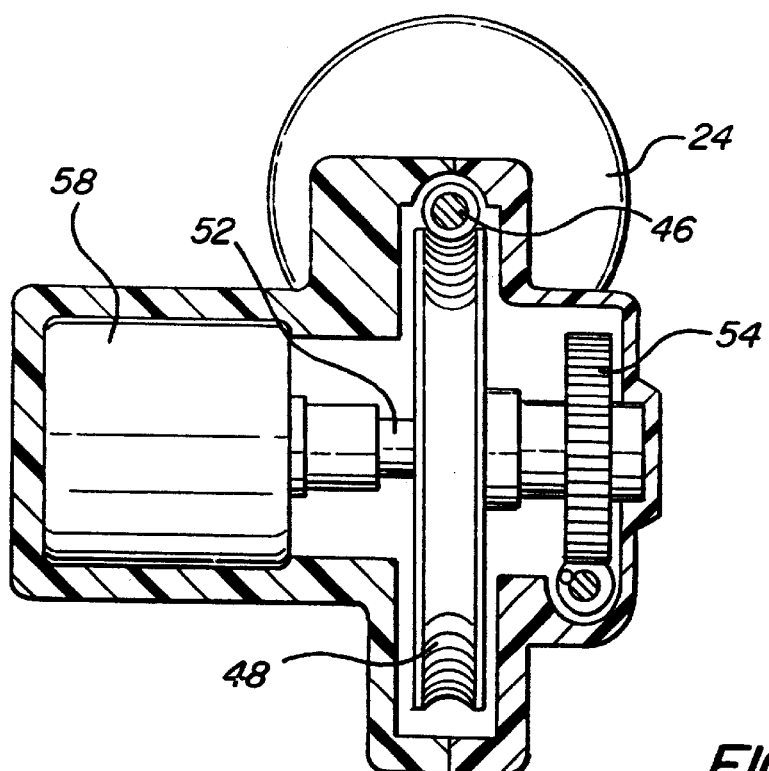
FIG. 3 is a cross section taken along line 3—3 of FIG. 2.

The drive assembly 26 is shown in more detail in FIG. 3. The drive assembly 26 is preferably comprised of a worm gear 46 and a worm wheel 48. The electric motor 24 includes an output shaft 50, shown in FIG. 2, for driving the worm gear 46. The worm gear 46 drives the worm wheel 48 which is fixedly supported on a support shaft 52. The support shaft 52 is spaced apart from and orientated perpendicularly to the output shaft 50. A worm gear assembly is the preferred drive assembly 26 because due to the orientation of the electric motor 24, the worm gear assembly is used to driveably connect the output shaft 52 to the nonparallel and nonintersecting support shaft 50.

Figure 2:
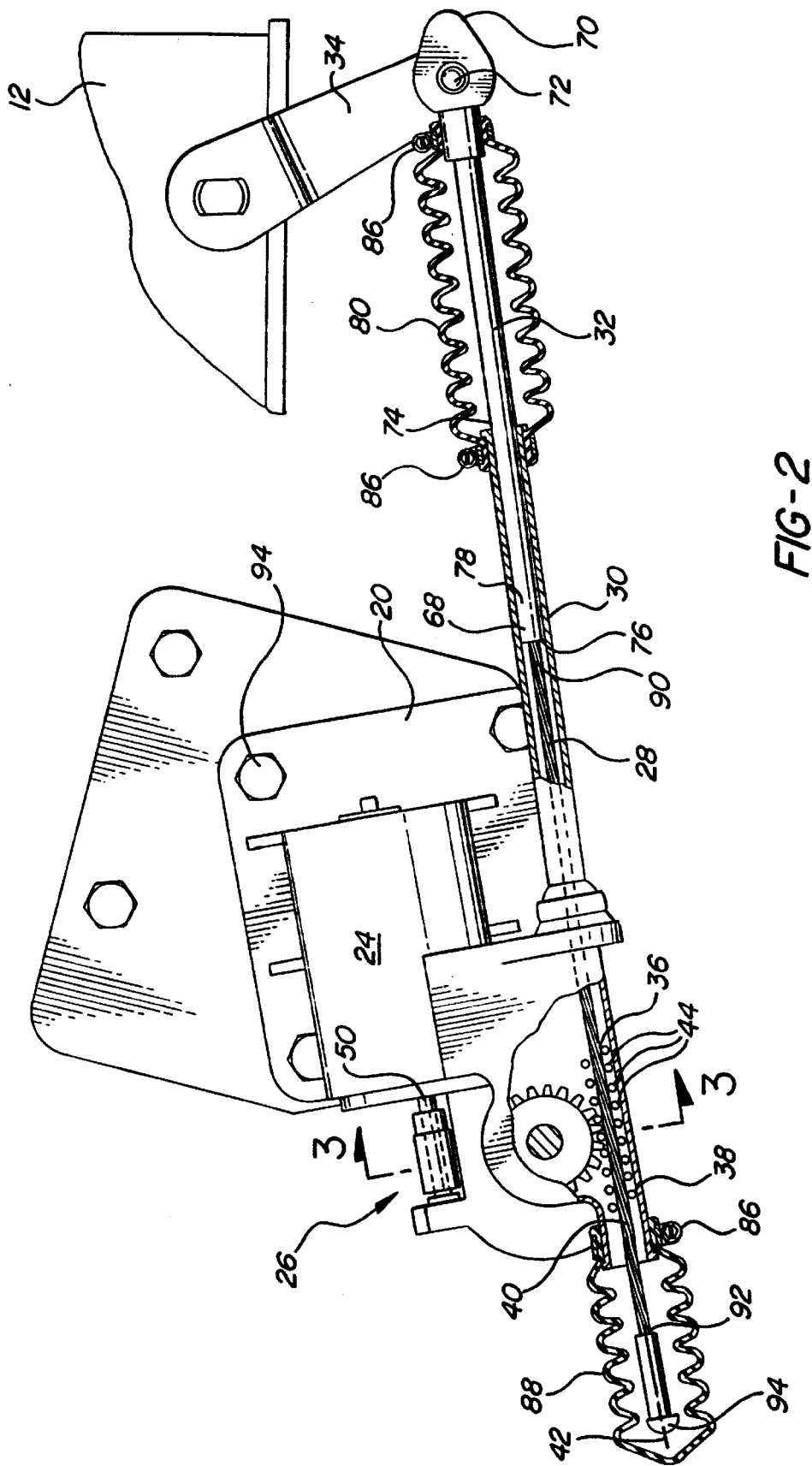
FIG. 2 is a magnified view of the assembly shown in FIG. 1 partially cut-away.

The drive assembly 26 preferably further includes a pinion gear 54 for driving the helical cable 36. The pinion gear 54 is also fixedly supported on the support shaft 52 and is spaced apart from the worm wheel 48, thus the worm wheel 48 and pinion gear 54 rotate together. In the preferred embodiment, the electric motor 24 drives the worm gear 46 which drives the worm wheel 48 which causes the pinion gear 54 to rotate such that the pinion gear 54 engages the tooth-like members 44 of the helical cable 36. As the teeth of the pinion gear 54 engage the tooth-like members 44 of the helical cable 36, the cable 36 is caused to move in either of two directions along a linear path. If the pinion gear 54 is rotating in a clockwise manner, as seen in FIG. 2, the helical cable 36 will move to the left which results in the shift lever 34 being pulled in a clockwise rotation. If the pinion gear 54 is rotating in a counter clockwise manner, the helical cable 36 will move to the right which results in the shift lever 34 being pushed in a counter clockwise rotation.

While a preferred gearing assembly has been disclosed, it should be noted that other drive mechanisms and other gearing configurations that are known in the art could also be used to drive the helical cable 36. For example, the drive assembly 26 could be configured such that the pinion gear 54 is eliminated and the worm wheel 48 directly drives the cable 36. Also, the electric motor could be repositioned such that a spur gear type assembly could be used to drive the helical cable 36 instead of a worm gear assembly, for example.

The electric shift apparatus 10 includes a controller 56, shown in FIG. 1, for transmitting a shift selection signal indicating a desired shift position that has been selected by the driver to the electric motor 24 to adjust the shift lever 34 to achieve the desired shift position. The controller 56 is shown mounted adjacent to the mode select lever 16, however, the controller 56 could be located anywhere in the vehicle.

A sensor 58 is used to determine the longitudinal position of the helical cable 36. The sensor 58 also transmits a cable position signal to the controller 56 for modifying the shift selection signal. Thus, the longitudinal position of the helical cable 36 is monitored to determine what shift position the transmission shift lever 34 is currently in. The current transmission shift lever position is compared to the shift selection signal initiated by the driver's input to ensure that the shift position selected by the driver is proper. In other words, the shift selection signal is compared to the cable position signal to ensure that the shift position selected by the driver corresponds to the shift position that the shift lever 34 is in. A preferred electrical drive circuit for comparing the cable position signal and the shift selection signal will be discussed in more detail below.

Preferably, the sensor 58 is a potentiometer which measures rotation of the worm wheel 48 and produces a rotation signal. The cable position signal would then be derived from the rotation signal. As shown in FIG. 3, the potentiometer sensor 58 is supported by the mounting structure 20 and positioned concentrically with the worm wheel 48. However, the potentiometer could be positioned and supported in other locations on the mounting structure 20. Also, the potentiometer could be used to measure the rotation of the pinion gear 54 or could be used to measure the linear movement of the helical cable 36 itself. While a potentiometer is the preferred sensor 58, other sensors known in the art could be used to determine the position of the helical cable 36.

Figure 5:
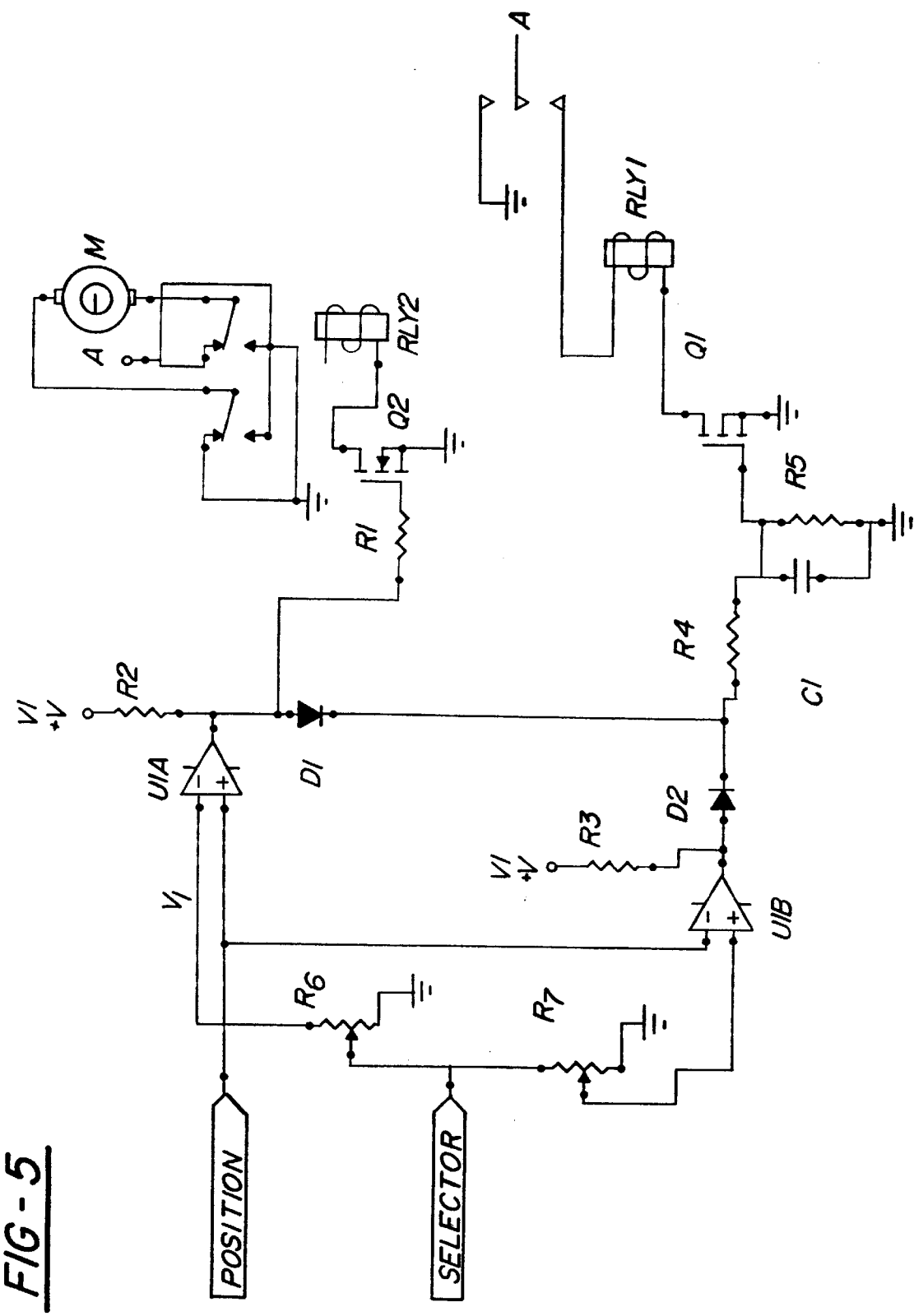
FIG. 5 shows a preferred embodiment of a drive circuit.

A preferred electrical drive circuit, shown in FIG. 5, utilizes the input from the mode select lever 16 and input from the sensor 58 and compares the cable position signal and the shift selection signal to power the electric motor 24 to control the shifting of the gears in the transmission 12. There are two main input voltages for the drive circuit. The first input is the output voltage, i.e. the cable position signal, from the sensor 58 which is proportional to the position of the cable 36 and communicates to the controller 56 whether the cable 36 is in the requested position. The second input is the voltage input from the driver as the mode select lever 16 is actuated, i.e., the shift selection signal. The second input can be one of a plurality of unique voltages that correspond to a specific gear position selected by the driver. In other words, there is a reference voltage associated with the park position that is different than the reference voltage associated with the reverse position that is different than the reference voltage associated with the drive position, etc.

The drive circuit also has two (2) outputs. The first output is a power signal that powers the electric motor 24. The second output is a direction control signal that communicates to the electric motor 24 what direction to drive the helical cable 36.

Both the cable position signal and the shift selection signal are communicated to two (2) comparators U1A, U1B. When the cable position signal exceeds a first predetermined voltage, comparator U1A goes high, producing a direction control signal that causes the helical cable 36 to move in the specified direction.

Simultaneously, path is provided from the comparator U1A to a timing circuit associated with the second output, i.e. the motor control. A certain pre-determined amount of time is needed to determine which direction the motor should be operation in. Once the predetermined time has passed and the direction control signal has been produced, the second output is energized to power the electric motor 24.

If the shift selection signal is less than a second predetermined voltage only the comparator U1B will go high, thus powering the motor 24. When the shift selection signal exceeds the second pre-determined voltage, power is no longer supplied to the motor 24 and the motor is grounded.

In addition to the components discussed above, the preferred drive circuit also includes the following components: two (2) diodes D1 and D2; seven (7) resistors R1 (preferably with 1K of resistance), R2 (preferably with 1K of resistance), R3 (preferably with 1K of resistance), R4 (preferably with 15k of resistance), R5 (preferably with 100K of resistance), R6 (preferably with 10k of resistance), and R7 (preferably with 10k of resistance); two transistors Q1 and Q2; two (2) relays RLY1 and RLY2; and one (1) capacitor (preferably 2200 pf). It should be understood that while the above values are preferred, other values can be used.

While a preferred drive circuit has been disclosed, it should be understood that other methods such as H-bridge drivers and microprocessors, for example, can be used to control the motor for shifting the transmission gears.

Figure 4:
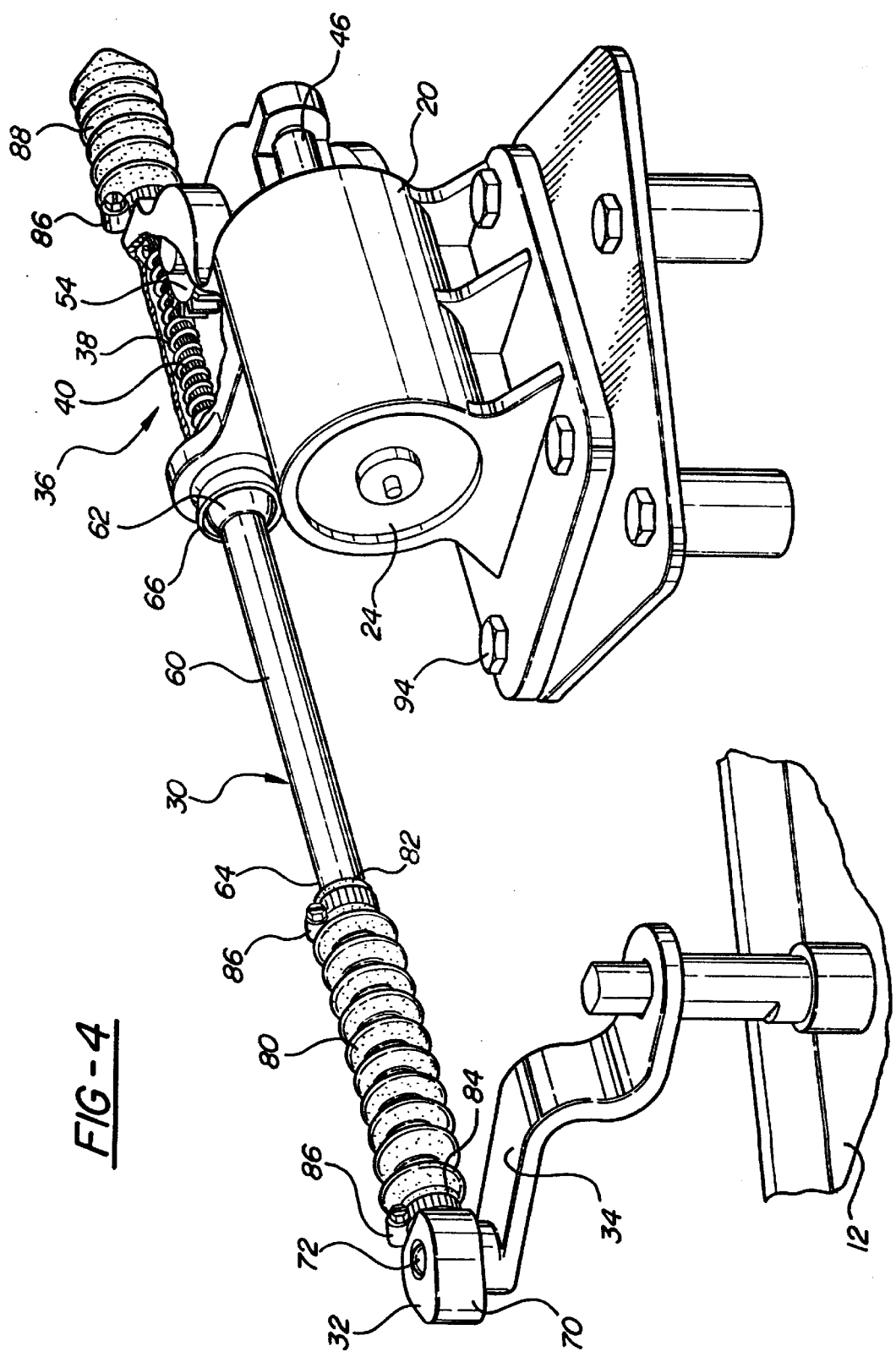
FIG. 4 is a perspective view of the subject invention, partially cut-away.

As best seen in FIG. 4, the guide 30 is comprised of a tube 60 which is supported by the mounting structure 20 for swiveling movement relative thereto. This swivel tube 60 configuration is used to compensate for any angular movement between the shift lever 34 and the mounting structure 20. The tube 60 includes a spherical end 62 and a distal end 64 located opposite from the spherical end 62. The mounting structure 20 includes an integral female pocket 66 that rotatably supports the spherical end 62 of the tube 60. The distal end 64 of the tube 60 is slidably supported on the terminal 32.

The terminal 32 includes a first end 68 and a second end 70. The first end 68 is in sliding engagement with the tube 60 and the second end 70 is attached to the shift lever 34. The shift lever 34 is rotatably attached to the transmission 12 at one end and includes a ball stud 72 at its other end. The second end 70 of the terminal 32 is, preferably snap fit onto the ball stud 72, however, other attachment methods known in the art could be used.

The terminal 32 further includes an outer surface 74 and an inner surface 76. The outer surface 74 slidably engages the tube 60 and the inner surface 76 includes a crimp section 78 deformed into gripping engagement with the helical cable 36. Crimping the terminal 32 onto the helical cable 36 is just one method of attachment, other attachment methods well known in the art could also be used.

A covering 80 is used to enclose the terminal 32 in order to prevent dirt and other contaminants from interfering with the sliding engagement between the terminal 32 and the tube 60. The covering 80 is preferably made from a flexible material such as rubber, that can extend and retract as the shift lever 34 is rotated with respect to the transmission 12. The covering 80 has a first end 82 that is attached to the tube 60 and a second end 84 that is attached to the terminal 32 near its second end 70. The covering 80 is attached to the terminal 32 and the tube 60 by means well known in the art, such as by clamps 86, for example. As previously mentioned, the covering 80 is preferably constructed as a rubber boot style covering made from an elastic material, however, other style coverings could be used.

A second covering 88 is used to enclose the helical cable 36 to prevent dirt and other contaminants from interfering in the interface between the worm wheel 48 and the tooth-like members 44 of the helical cable 36. This covering 88 is also preferably made from a flexible material such as rubber, that can be extended and retracted as the helical cable 36 moves along a linear path. The helical cable 36 includes a first end 90 and a second end 92. The first end 90 of the cable 36 is attached to the terminal 32 while the second end 92 extends outwardly from the mounting structure 20. A cap member 94 is supported on the second end 92 of the helical cable 36 for engagement with the covering 88. The cap member 94 prevents the end 92 of the helical cable 36 from damaging the covering 88. As with the first covering 80, the second covering 88 is attached to the mounting structure 60 by a clamp 86.

As previously mentioned, the mounting structure 20 is adapted to be mounted to the transmission housing 22. This mounting is done by bolts 94 or other fastening means known in the art.

Accordingly the subject invention, as discussed above, provides an electronic shift apparatus 10 that is easily attached to almost any transmission. This allows an electric shift feature to be easily implemented on current transmissions 12 without having to modify the transmission 12 itself. The apparatus 10 is also compact, which increases the packaging space available for other vehicle components, and can be flexibly mounted in the vehicle. The electric shift apparatus 10 has flexibility in mounting location, it can be located close to the transmission shift lever 34 or up to several inches away from the lever, depending on what packaging space is available.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An electric shift apparatus (10) for shifting a vehicle transmission assembly (12) comprising:

a mounting structure (20) adapted to be mounted to a vehicle structure;

an electric motor (24) supported by said mounting structure (20);

a drive assembly (26) operably driven by said electric motor (24);

a core element (28) having a longitudinal axis and movably supported by said mounting structure (20);

a guide (32) for guiding said core element (28);

a terminal (32) slidably disposed in said guide (30) and connected to said core element (28); and a shift lever (34) movable between a plurality of shift positions and connected to said terminal (30) for shifting a transmission (12);

said apparatus (10) characterized by said core element (28) comprising a helical cable (36) driven along said longitudinal axis by said drive assembly (26) for actuation of said shift lever (34).

2. An apparatus as set forth in claim 1 wherein said helical cable (36) comprises a filamentous member (38) and a core member (40) defining a longitudinal axis (42), said filamentous member (38) being wound about said core member (40) along said longitudinal axis (42).

3. An apparatus as set forth in claim 2 wherein said filamentous member (38) is wound in spaced convolutions to define tooth-like members (44) spaced apart from one another along said core member (40), said tooth-like members (44) in driven engagement with said drive assembly (26).

4. An apparatus as set forth in claim 2 including a controller (56) for transmitting a shift selection signal indicating a desired shift position to said electric motor (24) to adjust said shift lever (34) to achieve the desired shift position.

5. An apparatus as set forth in claim 4 wherein said drive assembly (26) is comprised of a worm gear (46) and a worm wheel (48).

6. An apparatus as set forth in claim 5 wherein said electric motor (24) includes an output shaft (50) for driving said worm gear (46).

7. An apparatus as set forth in claim 6 including a shaft (52) for supporting said worm wheel (48) and wherein said drive assembly (26) further includes a pinion gear (54) for actuating said helical cable (36), said pinion gear (54) being supported on said shaft (52) and spaced apart from said worm wheel (48).

8. An apparatus as set forth in claim 5 including a sensor (58) for sensing the longitudinal position of said helical cable (36) and transmitting a cable position signal to said controller (56) for modifying said shift selection signal.

9. An apparatus as set forth in claim 8 wherein said sensor (58) comprises a potentiometer which measures rotation of said worm wheel (48) producing a rotation signal, said cable position signal being derived from said rotation signal.

10. An apparatus as set forth in claim 9 wherein said potentiometer is positioned concentrically with said worm wheel (48).

11. An apparatus as set forth in claim 1 wherein said guide (30) is comprised of a tube (60) which is supported by said mounting structure (20) for swiveling movement relative thereto.

12. An apparatus as set forth in claim 11 wherein said mounting structure (20) includes an integral female pocket (66) and said tube includes a spherical end (62) rotatably supported in said female pocket (66).

13. An apparatus as set forth in claim 12 wherein said tube (60) includes a distal end (64), opposite from said spherical end (62), which is slidably supported on said terminal (32).

14. An apparatus as set forth in claim 13 wherein said terminal (32) includes a first end (68) in sliding engagement with said tube (60) and a second end (70) attached to said shift lever (34).

15. An apparatus as set forth in claim 14 wherein said shift lever (34) includes a ball stud (72), said second end (70) of said terminal (32) being snap fit onto said ball stud (72).

16. An assembly as set forth in claim 14 wherein said terminal (32) includes an outer surface (74) and an inner surface (76), said outer surface (74) for engaging said tube (60) and said inner surface (76) including a crimp section (78) deformed into gripping engagement with said helical cable (36).

17. An apparatus as set forth in claim 14 including a covering (80) for enclosing said terminal (32), said covering (80) supported on said mounting structure (20).

18. An apparatus as set forth in claim 17 wherein said covering (80) is comprised of a flexible material that can be extended and retracted as said shift lever (34) rotates, said covering (80) having a first end (82) attached to said tube (60) and a second end (84) attached adjacent to said second end (70) of said terminal (32).

19. An apparatus as set forth in claim 1 wherein said helical cable (36) includes a first end (90) and a second end (92), said first end (90) being attached to said terminal (32) and said second end (92) extending outwardly from said mounting structure (20).

20. An apparatus as set forth in claim 19 including a covering (88) for enclosing said second end (92) of said helical cable (36) wherein said covering (88) is supported on said mounting structure (20).

21. An apparatus as set forth in claim 20 wherein said covering (88) is comprised of a flexible material that can be extended and retracted as said helical cable (36) moves along a linear path.

22. An apparatus as set forth in claim 1 wherein the vehicle structure is formed as a transmission housing (22).

23. An electric shift apparatus (10) for shifting a vehicle transmission assembly (12) comprising:

a mounting structure (20) adapted to be mounted to a vehicle structure;

an electric motor (24) supported by said mounting structure (20);

a drive assembly (26) coupled to said electric motor (24);

a cable having a longitudinal axis and supported for movement relative to said modifying structure (20);

a shift lever (34) movable between a plurality of shift positions and connected to said cable actuator for shifting a transmission (12);

a controller (56) for transmitting a shift selection signal indicating a desired shift position to said electric motor (24) to adjust said shift lever (34) to achieve the desired shift position; and a sensor (58) for sensing the position of said cable and transmitting a position signal to said controller (56) for modifying said shift selection signal;

said apparatus (10) characterized by said cable being driven along said longitudinal axis by said drive assembly (26) for actuation of said shift lever (34) based on said shift selection signal.

24. An apparatus as set forth in claim 23 wherein said cable is a helical cable (36) comprising a filamentous member (38) and a core member (40) defining a longitudinal axis (42), said filamentous member (38) being wound about said core member (40) along said longitudinal axis (42).

25. An apparatus as set forth in claim 23 wherein said drive assembly (26) is comprised of a worm gear (46) and a worm wheel (48), said worm gear (46) being driven by an output shaft (50) of said motor (24).

26. An apparatus as set forth in claim 25 wherein said sensor (58) comprises a potentiometer which measures rotation of said worm wheel (48) producing a rotation signal, said position signal being derived from said rotation signal.

* * * * *